United States Patent
Feng et al.

(10) Patent No.: US 9,549,225 B2
(45) Date of Patent: *Jan. 17, 2017

(54) METHOD AND APPARATUS FOR MANAGING ADVERTISEMENTS USING SOCIAL MEDIA DATA

(71) Applicant: AT&T Intellectual Property I, LP, Atlanta, GA (US)

(72) Inventors: Junlan Feng, Basking Ridge, NJ (US); Bernard S. Renger, New Providence, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/510,839

(22) Filed: Oct. 9, 2014

(65) Prior Publication Data

US 2015/0026721 A1    Jan. 22, 2015

Related U.S. Application Data

(63) Continuation of application No. 13/688,632, filed on Nov. 29, 2012, now Pat. No. 8,887,197.

(51) Int. Cl.
| | |
|---|---|
| *H04N 21/81* | (2011.01) |
| *H04N 21/45* | (2011.01) |
| *H04N 21/2543* | (2011.01) |
| *H04N 21/4788* | (2011.01) |
| *G06Q 30/02* | (2012.01) |
| *G06Q 50/00* | (2012.01) |
| *H04L 29/08* | (2006.01) |

(Continued)

(52) U.S. Cl.
CPC ........ *H04N 21/812* (2013.01); *G06Q 30/0255* (2013.01); *G06Q 30/0269* (2013.01); *G06Q 50/01* (2013.01); *H04L 67/10* (2013.01); *H04N 21/25435* (2013.01); *H04N 21/25883* (2013.01); *H04N 21/2668* (2013.01); *H04N 21/4532* (2013.01); *H04N 21/4788* (2013.01)

(58) Field of Classification Search
USPC .......................................................... 725/35
See application file for complete search history.

(56) References Cited

U.S. PATENT DOCUMENTS

| | | | |
|---|---|---|---|
| 7,665,107 B2 | 2/2010 | Goodman et al. | |
| 8,375,131 B2 * | 2/2013 | Rogers .............. | G06F 17/30867 705/346 |

(Continued)

*Primary Examiner* — Pankaj Kumar
*Assistant Examiner* — Charles N Hicks
(74) *Attorney, Agent, or Firm* — Guntin & Gust, PLC; Douglas Schnabel

(57) ABSTRACT

A system that incorporates teachings of the subject disclosure may include, for example, obtaining social media data associated with a plurality of end user devices of a plurality of users interacting with a social media network where the social media data includes user commentary at the social media network, determining first targeted advertising for delivery to first end user devices of a portion of the plurality of users based on an analysis of the social media data, and determining second targeted advertising for delivery during a target broadcast programming to a second end user device of a target user of the plurality of users based on an analysis of the user commentary, wherein the analysis includes identifying a comment context. Other embodiments are disclosed.

17 Claims, 7 Drawing Sheets

(51) Int. Cl.
*H04N 21/258* (2011.01)
*H04N 21/2668* (2011.01)

(56) References Cited

U.S. PATENT DOCUMENTS

| | | |
|---|---|---|
| 8,413,189 B1 | 4/2013 | Parekh et al. |
| 8,510,773 B1 | 8/2013 | Abou-Rizk et al. |
| 2006/0218577 A1* | 9/2006 | Goodman .............. G06Q 30/02 725/32 |
| 2009/0055385 A1* | 2/2009 | Jeon .................. H04N 5/44543 |
| 2010/0121843 A1 | 5/2010 | Goeldi |
| 2011/0258049 A1 | 10/2011 | Ramer |
| 2012/0192227 A1* | 7/2012 | Fleischman ........ H04N 21/2407 725/34 |
| 2012/0215640 A1 | 8/2012 | Ramer et al. |
| 2012/0245996 A1 | 9/2012 | Mendez et al. |
| 2014/0122590 A1* | 5/2014 | Svendsen ............. H04N 21/252 709/204 |

\* cited by examiner

200

250

400

METHOD AND APPARATUS FOR MANAGING ADVERTISEMENTS USING SOCIAL MEDIA DATA

RELATED MATTERS

This application is a Continuation of and claims priority to U.S. patent application Ser. No. 13/688,632, filed on Nov. 29, 2012. The contents of the foregoing application are hereby incorporated by reference into this application as if set forth herein in full.

FIELD OF THE DISCLOSURE

The subject disclosure relates to a method and apparatus for managing advertisements using social media data.

BACKGROUND

Social media sites continue to grow at a fast pace. People of all generations use social media to exchange messages and share experiences of their daily life in a timely fashion. For example, they may post their opinions about a restaurant they are in at the moment or the television show they have just watched.

Television has become a new platform that users utilize to access social media while they watch television. Users are able to read social media messages on the television. With the dramatic growth of the wireless network speed, television content as of today is also delivered to mobile devices.

BRIEF DESCRIPTION OF THE DRAWINGS

Reference will now be made to the accompanying drawings, which are not necessarily drawn to scale, and wherein.

DETAILED DESCRIPTION

Figure 1:
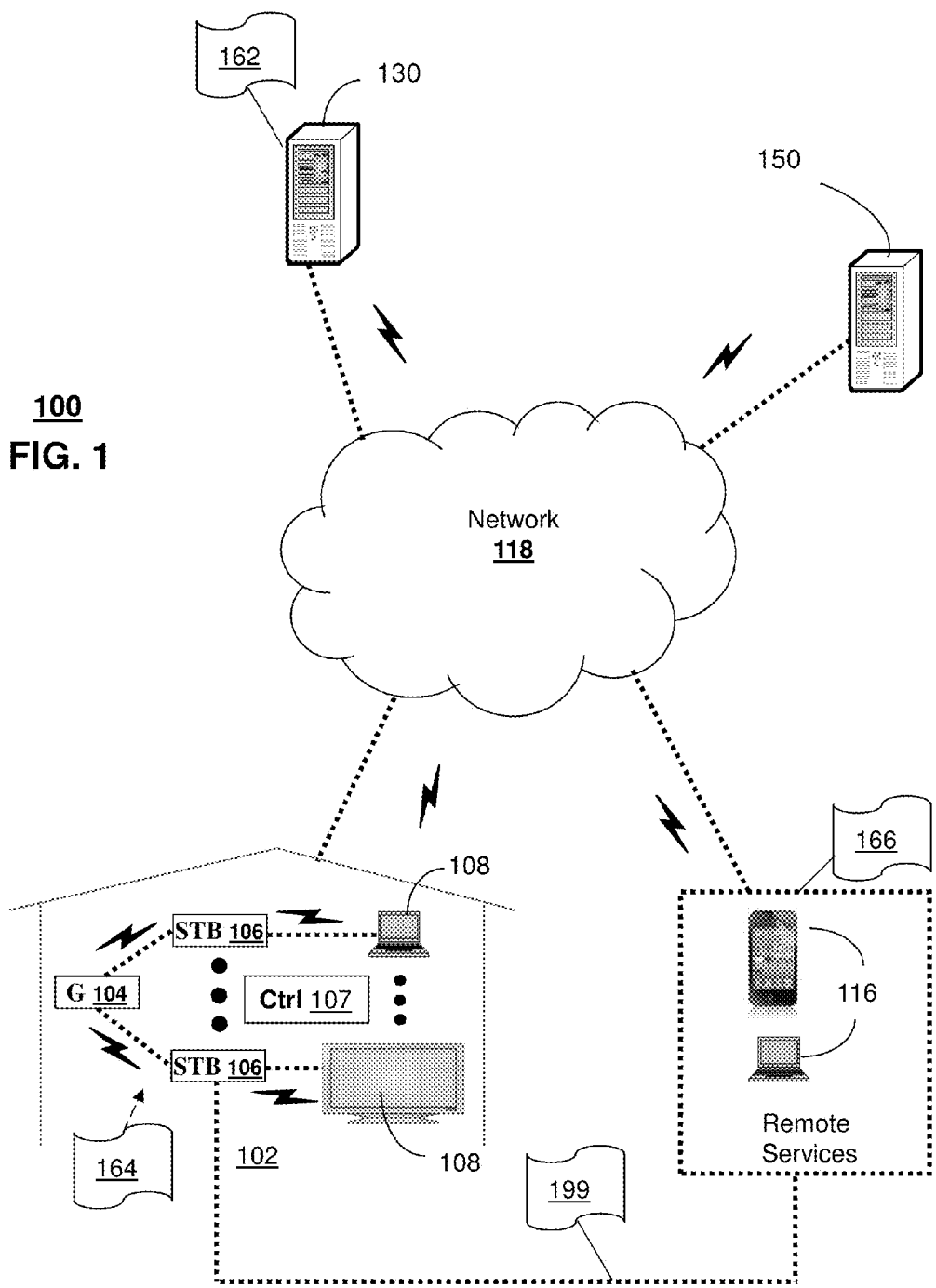
FIG. 1 depicts an illustrative embodiment of a communication system that provides targeted advertising.

The subject disclosure describes, among other things, illustrative embodiments for providing targeted advertising on a group level and/or an individual level based on an analysis of social media data for a social media network. The social media data can be associated with a group of users and can include various types of information, such as user comments and/or user interaction with the social media network. In one or more embodiments, the system can utilize a user model for managing the targeted advertising. The system can provide for a dynamic process in collecting, synthesizing, and interpreting data associated with users and can implement this dynamic process in determining targeted advertising to be utilized on an individual basis and/or a group basis for consumers. In one or more embodiments, the system enables measuring the influence of television commercials and television programs (or other advertising and media content in other mediums) by tracking its mentions and presence on social media, augmented by other user data, such as television household operation data. For example, the combined feedback can be used to continuously adjust the user models involved.

In one or more embodiments, the system can identify a plurality of users of a social media network, and can monitor the plurality of users to identify a first group that is associated with media programming based on social media posts and social network connections. The system can monitor the users to identify a second group that has consumed the media programming, and can monitor the users to identify a third group that has indicated (e.g., during user interaction with the social media network) an interest in products, categories of the products, services, or categories of the services. The system can generate first user models for each product and service, and can determine a set of relevant commercials for the products and services for a target media program based on similarities detected between the third group and the first and second groups. The system can, for each relevant commercial of the set of relevant commercials, determine a subset of users from the first and second groups having an improved match with the third group that is associated with the relevant commercial. The system can generate second user models for each of the subsets of users that describe characteristics of the subset of users. The system can, for a target consumer of the target media program, provide a subset of the set of relevant commercials based on a probability that the target consumer correlates with one of the second user models.

In one or more embodiments, the targeted user-specific advertising can be generated based on detecting user comments indicating an interest in a product (or service) and detecting user comments indicating an interest in selected television programming. In one or more embodiments, the targeted user-specific advertising can be placed in a selected advertising slot among a group of possible slots for selected television programming based upon an analysis of the context of the segment of the programming immediately preceding the selected slot. Other embodiments are included in the subject disclosure. In one or more embodiments, if targeted advertising can be generated for an individual user of the group of users then the targeted user-specific advertising can be delivered to an end-user device of the individual user, otherwise advertising that has been targeted to the group of users is delivered to the individual user's end user device.

In one or more embodiments, a method is provided that can include identifying a plurality of users of a social media network. The method can include monitoring end user devices of the plurality of users to identify a first user group of the plurality of users that are associated with or have consumed media programming and to identify a second user group of the plurality of users that have indicated an interest in products, categories of the products, services, or categories of the services. First user models can be generated for the products and services so that a set of relevant commercials can be determined for the products and services for a target media program based on similarities detected between the first and second user groups. A subset of users from the first user group can be identified having an improved match with the second user group that is associated with the set of relevant commercials. Second user models describing user characteristics can be generated for the subsets of users. For a target consumer of the target media program, a subset of the set of relevant commercials can be provided based on a probability that the target consumer correlates with one of the second user models.

One embodiment of the subject disclosure includes a server having a memory and a processor. The memory stores computer instructions and the processor is coupled to the memory. The processor, responsive to executing the computer instructions, performs operations including obtaining social media data associated with a plurality of end user devices of a plurality of users interacting with a social media network, where the social media data includes comments posted at the social media network and interaction information indicating an interest in a product. The processor identifies a correlation between products and media content for a portion of the plurality of users based on an analysis of the social media data, and selects first targeted advertising for delivery to first end user devices of the portion of the plurality of users based on the correlation. The processor identifies target broadcast programming for a target group of users of the plurality of users based on an analysis of the comments posted at the social media network, and identifies a target user of the target group of users that have indicated the interest in the product based on an analysis of the interaction information. The processor selects second targeted advertising for delivery during the target broadcast programming to a second end user device of the target user based on the product, wherein the target user is not one of the portion of the plurality of users.

One embodiment of the subject disclosure is a method including obtaining, by a system including a processor, social media data associated with a plurality of end user devices of a plurality of users interacting with a social media network, where the social media data includes user commentary at the social media network. The method includes determining, by the system, first targeted advertising for delivery to first end user devices of a portion of the plurality of users based on an analysis of the social media data. The method includes determining, by the system, second targeted advertising for delivery during a target broadcast programming to a second end user device of a target user of the plurality of users based on an analysis of the user commentary, where the target user is not included in the portion of the plurality of users. The method includes determining a context for segments of the target broadcast programming, where each of the segments precedes an advertisement slot in the target broadcast programming. The method includes selecting a target segment for insertion of the second targeted advertising from among the segments based on a correlation between the context and a portion of the social media data associated with the target user.

One embodiment of the subject disclosure includes a tangible computer-readable storage medium comprising computer instructions, which, responsive to being executed by a processor, cause the processor to perform operations including obtaining social media data associated with a plurality of end user devices of a plurality of users interacting with a social media network, where the social media data includes user commentary at the social media network. The computer instructions include determining first targeted advertising for delivery to first end user devices of a portion of the plurality of users based on an analysis of the social media data. The computer instructions include determining second targeted advertising for delivery during a target broadcast programming to a second end user device of a target user of the plurality of users based on an analysis of the user commentary, where the analysis includes identifying a comment context.

Figure 2A:
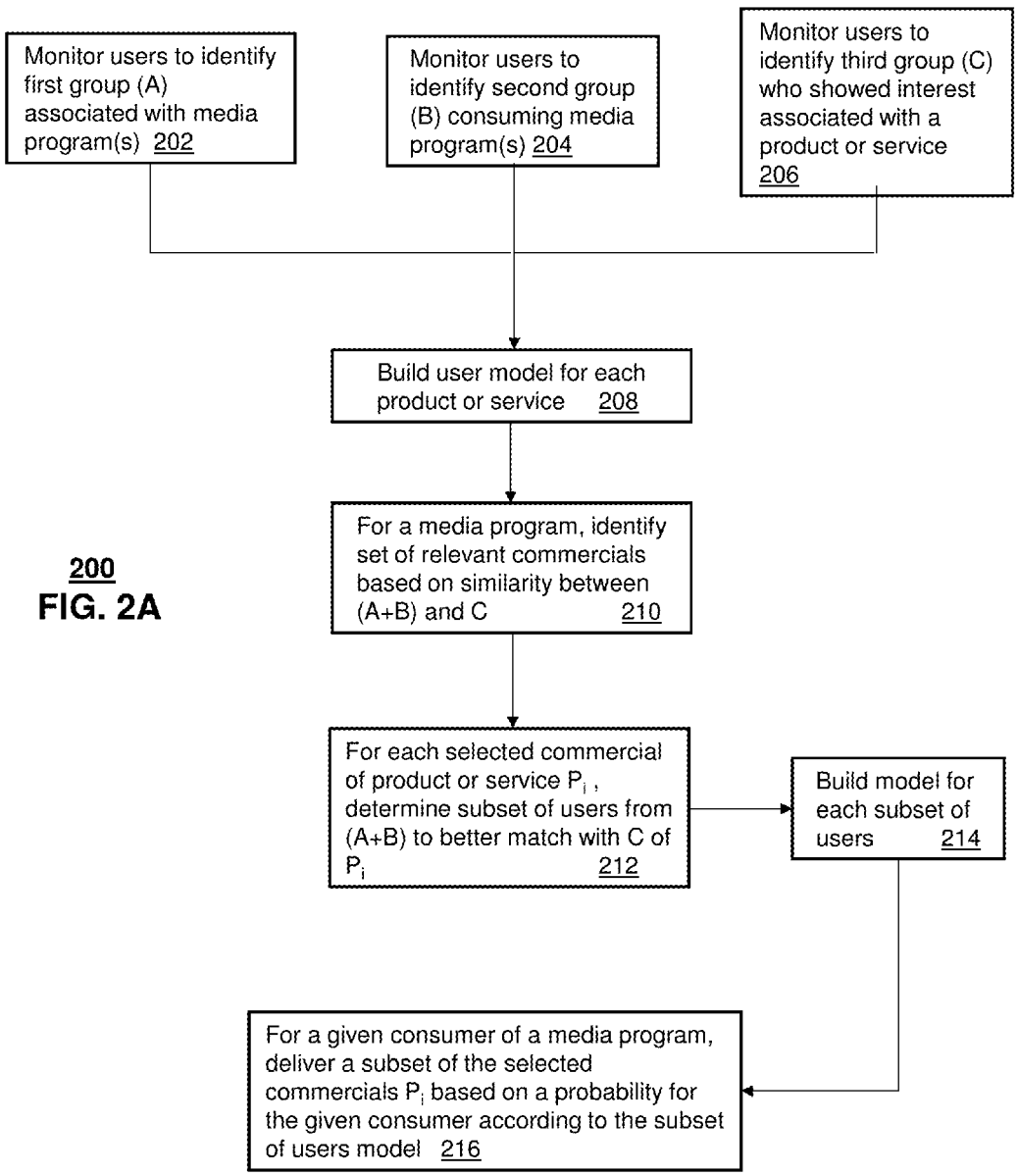
FIGS. 2A and B depict illustrative embodiments of methods for delivering media services including targeted advertising.

Referring generally to FIGS. 1 and 2A, an illustrative embodiment of a communication system 100 and method 200 for obtaining social media data associated with a plurality of users that interact with one or more social media networks is depicted. System 100 and method 200 can select and/or provide targeted advertising for the plurality of users and/or a portion of those users based on the social media data and/or based on other information, such as purchasing habits, media consumption habits, and so forth.

Method 200 can include data collection steps 202, 204 and 206 for a plurality of users that are associated with a social media network(s). The exemplary embodiments can collect data with respect to any number of social media networks, where the data is aggregated for targeting advertising or where the data is separately analyzed for targeting advertising. As an example at 202, the system 100 can follow or otherwise collect data for users who are associated with a media program on the social media network, such as through direct commenting (e.g., posts) and/or friend networks or connections (i.e., a first group A). At 204, the system 100 can follow or otherwise collect data for users who have watched or consumed a media program (i.e., a second group B). At 206, the system 100 can follow or otherwise collect data for users who have shown interest in a product, a service, and/or a category of product & service on the social media network (i.e., a third group C). At 208, the system 100 can build a user model for each product or service. At 210, for a given media program, the system 100 can find a set of relevant commercials of products and services by considering the similarity between the groups, such as a similarity between (A+B) and (C). At 212, for each selected commercial of a product Pi, the system 100 can find a subset of users from selected groups (e.g., A+B) to better match with the user group C of Pi. At 214, the system can build a user model to generalize the characteristics of each subset of users. At 216, for a given consumer of a media program, the system 100 can deliver a subset of Pi, based on the probability of this user being under or otherwise correlated to the user model of Pi.

In one or more embodiments, system 100 can enable targeted advertising to be filtered to a number of different levels, such as selecting first advertising for the plurality of users, selecting second advertising for a subset of the plurality of users, and selecting third advertising for an individual user of the sub-set of users. In this example, the individual user would receive the third advertising, the subset of user except the individual user would receive the second advertising, and the plurality of users except the subset of users would receive the first advertising. The selection of the advertising can be based on an analysis of the social media data and determining correlations, such as a first correlation between the plurality of users and the first advertising, a second correlation between the subset of users and the second advertising, and a third correlation between the third advertising and the individual user.

Other techniques for selecting the targeted advertising from among the different levels of targeted advertising can also be utilized. For instance, the individual user can be provided with the third advertising (which is targeted directly for the individual user) in an advertisement slot of targeted television programming while providing the first and second advertising in other television programming that has not been targeted for the individual user. In this example, the targeted television programming can be a program that is predicted to be viewed or potentially viewed by the individual user, such as based on an analysis of the social media data.

The communication system 100 can represent various types of media systems or portions thereof, including interactive television (e.g., an Internet Protocol Television (IPTV) media system), telephone and/or data services systems. Packets associated with media content, data content, voice content and so forth can be received from and/or delivered to various devices, including end-user devices, over a network 118. For instance, in an IPTV environment, the packets can be delivered utilizing a multicast communication protocol. However, system 100 can utilize various communication protocols to route traffic and otherwise manage information being transmitted between devices, including broadcast and unicast techniques.

System 100 can distribute multimedia content (e.g., broadcast, multicast and/or unicast content) which can include television programming and advertising via the network 118 to commercial and/or residential buildings 102 (only one of which is shown) housing a gateway 104 (such as a residential or commercial gateway). The network 118 can represent a group of digital subscriber line access multiplexers (DSLAMs) located in a central office or a service area interface that provide broadband services over fiber optical links or copper twisted pairs to buildings 102. Wireless communications can also be utilized in the delivery of the broadband services, with or without the use of hardwire links. The gateway 104 can use communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and/or the media devices 108 can utilize tethered communication technologies (such as coaxial, powerline or phone line wiring) and/or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services. Modulated signals can be transferred to the media processors 106 for demodulating, decoding, encoding, and/or distributing broadcast channels to the media devices 108. The media processors 106 can be equipped with a broadband port to an Internet Service Provider (ISP) network to enable interactive services such as VoD and EPG as described above.

The subject disclosure can apply to other over-the-air and/or landline media content services system. Multiple forms of media services can be offered to media devices over landline technologies such as those described above. Additionally, media services can be offered to media devices by way of a wireless access base station operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other wide area wireless access network technologies can be used in one or more embodiments of the subject disclosure.

Some of the network elements of the IPTV media system can be coupled to one or more computing devices 130, a portion of which can operate as a web server for providing web portal services over the network 118 to wireline media devices 108 or wireless communication devices 116.

System 100 can also provide for all or a portion of the computing devices 130 to function as an advertising manager (herein referred to as server 130). Server 130 is illustrated as a single server, however, the server 130 can be a group of servers in various configurations, including a master-slave arrangement and/or a distributed environment where functions are shared or isolated amongst the servers. The server 130 can use computing and communication technology to perform function 162, which can include among other things, providing targeted advertising on a group level and/or an individual level based on an analysis of social media data for a social media network 150. Social media network 150 is illustrated in FIG. 1 as a server managing the social media network (e.g., Facebook®, YouTube®, Twitter®, and so forth), however it should be understood that the social media network can include any number and configuration of components, including in a centralized or distributed environment. The social media network 150 can be a system that is managed by a third party that is independent of the service provider operating server 130, or can be a social media network operated by the service provider. The media processors 106 and wireless communication devices 116 can be provisioned with software functions 164 and 166, respectively, to utilize the services of server 130. Software functions 164 and 166 can include enabling interfacing with server 130 for receiving targeted advertising. In one or more embodiments, the functions 164 and 166 can include providing user/device information collected by the media processors 106 and/or devices 116, such as media consumption data, website accessing habits, web clicking data, purchasing history, and so forth.

System 100 can perform a number of functions for selecting targeted advertising using a number of different devices such as server(s) 130, media processor 106, wireless communication device(s) 116, and combinations thereof. For the following exemplary embodiment, these functions will be described as being performed by the server 130. In one or more embodiments, server 130 can collect television-related and/or product/services-related social media data including those related to television shows and commercials. In one or more embodiments, the social media data can be obtained directly from the social media network 150, such as based on authorization provided by a plurality of users, by the server 130. However, system 100 can use other components and techniques for collecting social media data, including collection by various devices (e.g., local end-user devices).

In one or more embodiments, server 130 can mine the obtained data and analyze the common aggregated characteristics of users, such as for a given television show and/or commercial. In one or more embodiments, server 130 can build or generate one or more user models for each television show and/or commercial, including modeling of users' likes/dislikes, topics of interest, style preferences (such as melodies used in the commercials, animation, or slogans), and so forth. These models can be built on the mined social media data augmented by other information, including operation data resources such as users' watching behavior, users' geography, demographics, and so forth.

In one or more embodiments, server 130 can perform user modeling such as for the whole group of users who discussed a given show and/or commercial or for individuals with their permission. In one or more embodiments, server 130 can maximize or increase the persuasion of television commercials by optimizing or increasing the relevancy between users' interest (e.g., represented by the user models) and the television show and the associated commercials, which are aired during the show.

In one or more embodiments, server 130 can determine or measure the popularity of television programming by tracking its mentions and presence on social media. In one or more embodiments, the tracking can include determining a context of comments related to the programming and determining likes or dislikes or otherwise predicting potential viewing of upcoming episodes based on the meaning of the comments. In one or more embodiments, the tracking can include determining a number of mentions of the television programming without determining a context of the comments.

In one or more embodiments, server 130 can measure the influence of a television commercial by tracking its mentions and presence on social media. In one or more embodiments, the tracking can include determining a context of comments related to the advertisements and determining likes or dislikes based on the meaning of the comments. In one or more embodiments, the tracking can include determining a number of mentions of the advertisements without determining a context of the comments.

In one or more embodiments, server 130 can cross-reference shared information from the group of users (e.g., a user and the user's friends) on social media sites with the media content being consumed on the television. A network carrier can know the user's identity (e.g., on the household level or on individual level if a companion device is being utilized that is paired to a set top box). For example, a mobile device 116 can be paired with a STB 106 via pairing instructions 199 that may be resident on and executable by one or both of the mobile device and the STB. In one or more embodiments, if the user provides social media login information, then that user's social media messaging interaction and that for his or her friends may also be available. For example, a user may tweet about the problems he or she is having with cooking using his or her oven and the server 130 can subsequently deliver to the media processor 106 of the user an advertisement about an oven for sale. In this example, the advertisement can be delivered for insertion in targeted programming which the server 130 predicts the user will be viewing, such as based on analysis of the social media data (e.g., comments indicating that the user enjoys viewing a particular show) and/or based on monitored media consumption habits (e.g., TV usage data or web click data).

In one or more embodiments, server 130, depending on which opt-in options a user has subscribed to, can get group/aggregated focused advertising and/or individually focused advertising. In one or more embodiments, the more information that is volunteered, the more focused the advertising. In one or more embodiments, server 130 can collect individual-level information (some of which can require user opt-in) including social media login information; television usage information (such as for a user that has a companion device paired to a particular STB or some other mechanism); mobile television usage information (e.g., where login information or a cookie is available); television household subscription/profile information (e.g., linking the name to a home address and credit card); internet browsing or purchase history (e.g., used to correlate to particular online retailers); and/or home address and credit card information. In one or more embodiments, if the user is utilizing a mobile device (e.g., over a cellular network or Wi-Fi network), then server 130 can mine the URLs used to purchase products to determine the products. In one or more embodiments, the collected individual-level information can include demographics (e.g., can be specific or if not available can utilize aggregated demographics based on location of neighborhood); and/or location information such as using GPS or mobile device or household location.

In one or more embodiments, server 130 can collect group/aggregated-level information, including social media login information (e.g., only use aggregated view of user or friends and not have access to instant messages or other user interaction that is private); aggregated television usage for the household or neighborhood or other grouping of users; purchase history of different kinds of products in different geographic areas for the grouping of users (e.g., for a generator because of anticipated or the current lack of electricity in a certain geographic area); and/or aggregated demographics/location.

In one or more embodiments, server 130 can select targeted advertising by mining overall interest of social media sites and categorizing the different types of products a user might want. In one or more embodiments, server 130 can build or otherwise create a recommendation engine based on aggregated social media messages to determine potential TV shows or advertisements that might be desirable. So this is before linking or cross referencing the individual information. The server 130 can select targeted advertising on a group level, on an individual level, or on both levels based on the various information described above, including the social media data and analysis of user commentary. The selection of the targeted advertisements can be a recommendation provided to an advertising source which may then approve the recommendation or the selection may be an insertion of the advertising in the media content, such as where the selection is from among a group of available advertisements.

Figure 2B:
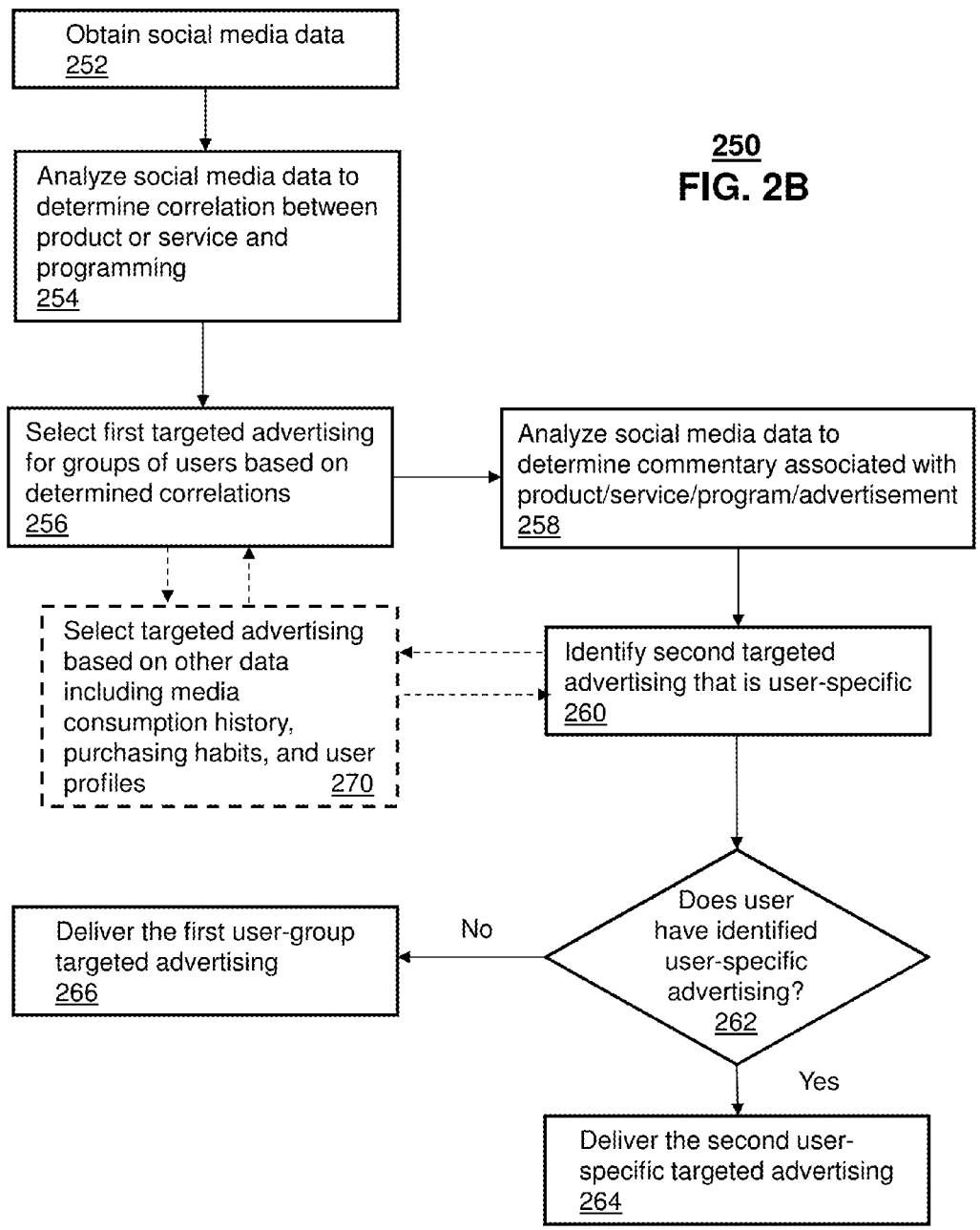

FIG. 2B depicts an illustrative method 250 that operates in portions of the devices of FIG. 1 and/or the devices or systems described with respect to other exemplary embodiments herein. Method 250 can be performed separately from method 200 or can be combined, in whole or in part, with method 200. Method 250 can begin at 252 in which social media data is obtained, such as by the server 130, the media processor 106, the mobile device 116 and/or some other data collection device. The collection can be centralized, such as the server collecting the social media data directly from server 150 of the social media network, or the collection can be distributed, such as local devices (e.g., media processors 106) collecting a portion of the data and remote devices (e.g. server 130) collecting another portion of the data. In one or more embodiments, the collection of the data can be associated with particular end user devices that are associated with a plurality of users for whom the social media data is to be collected.

The particular type of social media data collected can vary and can include user comments, interaction information (e.g., depressing like/dislike, accessing information via the social media network), user profile information (e.g., user preferences, user demographics), user contact lists (e.g., user friends and user block lists), and so forth. As an example, the social media data can include comments posted at the social media network and interaction information indicating an interest in a product or services. The social media data can be collected for various users and groups of users, which can be grouped together based on a number of different factors, such as age, gender, employment type, geographic location (e.g., same household, same apartment building, same neighborhood, same city, etc.), and/or relationship to each other (e.g., family friends).

At 254, the social media data or a portion thereof can be analyzed, such as by server 130 or media processor 106, to determine correlations, including a correlation in the social media data between products/services, television programming and/or users. At 256, first targeted advertising can be selected, such as by server 130, based on the analysis of the social media data and the detected correlations. The first targeted advertising can be selected for a portion of the plurality of users for which the social media data has been collected. As an example, social media data collection can be performed for a plurality of users that are related geographically by residing in a specific neighborhood. A portion of those users can have an interest in skiing and/or may likely watch a scheduled skiing event on television. Based on this correlation, first targeted advertising directed to skis for sale can be selected for this portion of users. The skiing advertising can be selected to be provided for insertion during the skiing event programming.

At 258, user commentary can be detected in the social media data and can be analyzed to determine a relationship to one or more of products, services, television programming, and advertisements. For instance, the user commentary can be analyzed to determine whether any users are commenting on a product or service that they have seen someone else using, or commenting on a television show that they have watched before or heard about, or commenting on a television advertisement that they watched and thought was very funny. At 260, second targeted advertising can be selected, such as by server 130, based on the analysis of the social media data, including the analysis of the user commentary. As an example, the server 130 can identify target broadcast programming for a target group of users of the plurality of users based on an analysis of the context and/or number of mentions of comments posted at the social media network. The server 130 can also identify a target user of the target group of users that have indicated an interest in a product/service based on an analysis of the user commentary (e.g., context or number of mentions) and/or interaction information associated with the product/service (e.g., pressing like button on a post regarding the product or service or accessing information describing the product/service via the social media network).

At 262, it can be determined, such as by the server 130, whether a selection of the second user-specific advertising has been made for a particular user. If the second user-specific advertising has been selected for the particular user then at 264 a user end device (e.g., media processor 106 or mobile device 116) can be provided (e.g., via unicast or multicast) with the second user-specific advertising, such as inserted during targeted programming which can be identified based on the analysis at 258. If second user-specific advertising has not been selected for the particular user then at 266 a user end device (e.g., media processor 106 or mobile device 116) can be provided with the first user-group advertising, such as inserted during targeted programming which is identified based on the analysis at 254. Method 250 provides for targeted advertising on two levels, where the first level is an individual level, and in the absence of a detected correlation in the user commentary analysis for that particular user, method 250 provides the targeted advertising on the second level which is the group level that is targeted based on correlations detected from the group data analysis. Method 250 can also utilize any number of levels of targeted advertising, where each level can be broken down by being a sub-group of a larger group that has additional detected correlations. For example, a first group can be users for whom it is determined that they watch college football games and like to go to sit-down restaurants. A second group can be a sub-group of the first group for whom it is determined that they watch South Eastern Conference college football games and like to go to barbecue restaurants. An individual user can be a sub-grouping from the second group for whom it is determined that he or she watches University of Florida football games and likes to goes to Sonny's® barbecue. In this example, different advertisements can be provided to the individual user and the members of the first and second groups based on these determinations according to the social media data.

Method 250 can also utilize other data at 270 to facilitate the selection of the first and/or second targeted advertising. The other data can include media consumption history including web click data, purchasing history, user profiles, user preferences, demographics, and so forth. Method 250 illustrates several functions that can be performed by the server 130, the media processor 106, the mobile device 116 and combinations of these devices. The exemplary embodiments can also utilize less than all of the functions described in method 250, as well as add additional functions or rearrange the order of the functions.

In one or more embodiments, method 250 can provide for determining a context for each segment of a plurality of segments of a target broadcast programming, where each segment precedes an advertisement slot in the target broadcast programming, and can provide for selecting a target segment from among the plurality of segments based on another correlation between the context and a portion of the social media data associated with the target user. These determination and selection steps can be performed by the server 130, the media processor 106 and/or the mobile device 116. The determination of context of the user commentary and/or the television programming can be based on a number of techniques, including speech recognition and/or natural language understanding technologies. Other techniques can also be employed, such as analyzing metadata associated with segments of the media content or performing image recognition analysis to determine the context of the programming.

Figure 3:
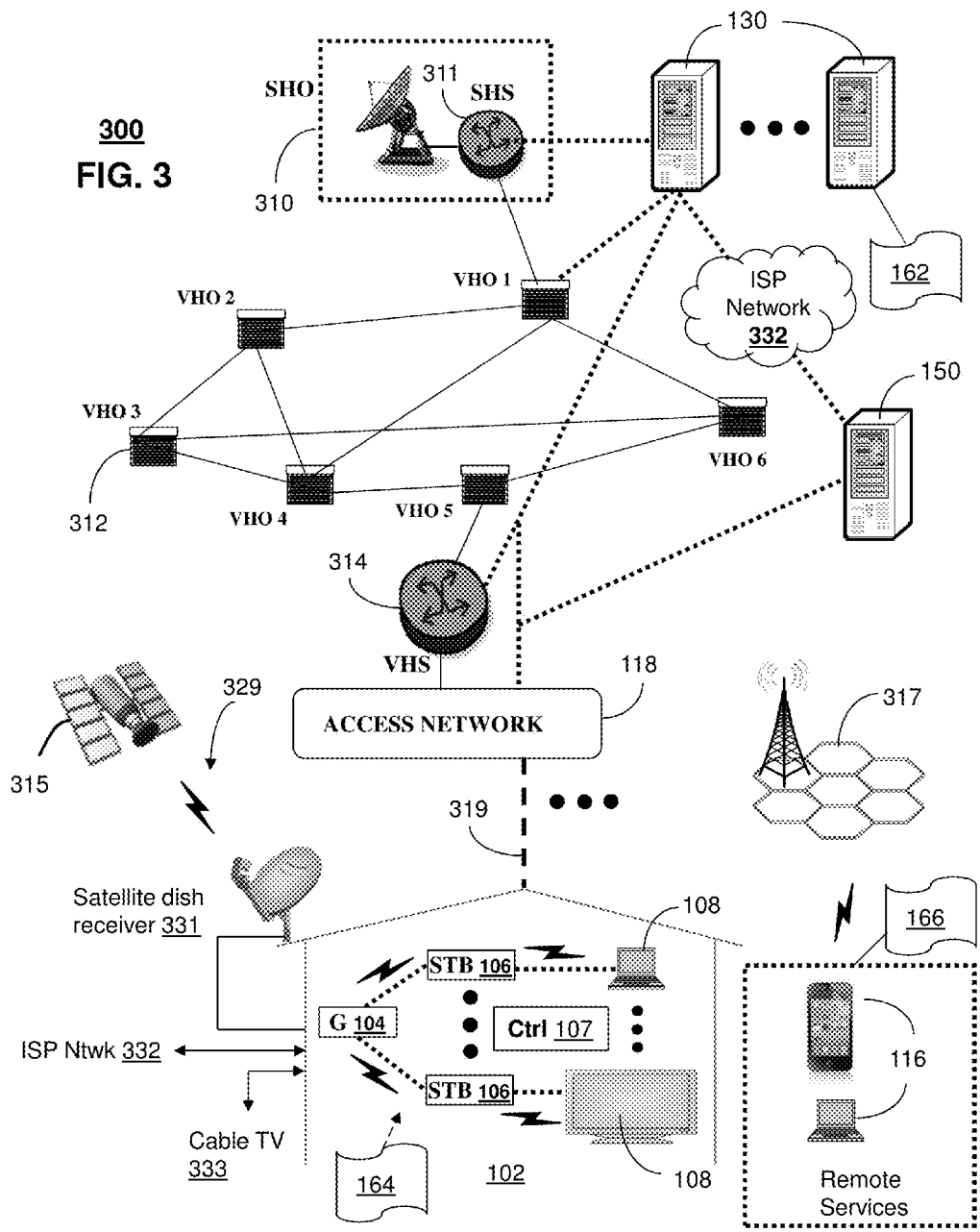
FIGS. 3-4 depict illustrative embodiments of communication systems that provide media services including targeted advertising.

FIG. 3 depicts an illustrative embodiment of a communication system 300 for delivering media content including television programming and advertisements, as well as collecting social media data from social media network 150. System 300 is illustrated utilizing an architecture of particular components and configurations. It should be understood that other components and/or configuration can also be utilized with system 300 such that the system performs the exemplary techniques described herein (e.g., one or more of the steps of methods 200 and/or 250) utilizing a different architecture. The exemplary embodiments can include various architectures performing the exemplary techniques and is not intended to be limited to the particular components and configurations illustrated in FIG. 3.

System 300 can provide targeted advertising on a group level and/or an individual level based on an analysis of social media data associated with a group of users of a social media network. In one or more embodiments, targeted user-specific advertising can be placed in a selected advertising slot among a group of possible slots for a selected television program based upon an analysis of a context of a segment of the programming immediately preceding the selected slot and based on an analysis of user commentary posted at the social media network 150.

In one or more embodiments, system 300 can obtain the social media data limited to interaction between a plurality of end user devices and the social media network 150 via an interactive television network, such as wherein the user is posting comments or otherwise interacting with the social media network through his or her television. In one or more embodiments, system 300 can obtain the social media data directly from the social media network 150 based on authorization provided by each of the plurality of users. In one or more embodiments, system 300 can identify a correlation between products and media content for a plurality of users by generating a user model for each of the media content. The user model can indicate predicted user characteristics based on the analysis of the social media data. In one or more embodiments, system 300 can identify a correlation between products and media content for a plurality of users by generating a user model for each of a group of potential advertisements for the products. The user model can indicate predicted user characteristics based on the analysis of the social media data. In one or more embodiments, a selection of a targeted advertisement can be made from among the group of potential advertisements based on the user model.

In one or more embodiments, interaction information can be used in determining correlations for selecting targeted advertising, where the interaction information includes user input to access information descriptive of the product. In one or more embodiments, system 300 can identify target broadcast programming for a target group of users based on a determination of a comment context for comments posted at the social media network. In one or more embodiments, system 300 can identify target broadcast programming for a target group of users based on a determination of a number of comments associated with the target broadcast programming without an analysis of a comment context for the comments.

The communication system 300 can represent an Internet Protocol Television (IPTV) media system. The IPTV media system can include a super head-end office (SHO) 310 with at least one super headend office server (SHS) 311 which receives media content from satellite and/or terrestrial communication systems. In the present context, media content can represent, for example, audio content, moving image content such as 2D or 3D videos, video games, virtual reality content, still image content, and combinations thereof. The SHS server 311 can forward packets associated with the media content to one or more video head-end servers (VHS) 314 via a network of video head-end offices (VHO) 312 according to a multicast communication protocol.

The VHS 314 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 319 to buildings 102. The gateway 104 can use communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and/or media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 329 can be used in the media system of FIG. 3. The satellite broadcast television system can be overlaid, operably coupled with, or replace the IPTV system as another representative embodiment of communication system 300. In this embodiment, signals transmitted by a satellite 315 that include media content can be received by a satellite dish receiver 331 coupled to the building 102. Modulated signals received by the satellite dish receiver 331 can be transferred to the media processors 106 for demodulating, decoding, encoding, and/or distributing broadcast channels to the media devices 108. The media processors 106 can be equipped with a broadband port to an Internet Service Provider (ISP) network 332 to enable interactive services such as VoD and EPG as described above.

In yet another embodiment, an analog or digital cable broadcast distribution system such as cable TV system 333 can be overlaid, operably coupled with, or replace the IPTV system and/or the satellite TV system as another representative embodiment of communication system 300. In this embodiment, the cable TV system 333 can also provide Internet, telephony, and interactive media services.

The subject disclosure can apply to other present or next generation over-the-air and/or landline media content services system.

Some of the network elements of the IPTV media system can be coupled to the computing devices 130, a portion of which can operate as a web server for providing web portal services over the ISP network 332 to wireline media devices 108 or wireless communication devices 116. As described with respect to FIG. 1, server(s) 130 can perform a number of functions 162 including collecting data (e.g., social media data and historical data) and selecting targeted advertising for individual users and/or groups of users. The media processors 106 and wireless communication devices 116 can be provisioned with software functions 164 and 166, respectively, to utilize the services of server 130. Software functions 164 and 166 can include enabling interfacing with server 130 for receiving targeted advertising. In one or more embodiments, the functions 164 and 166 can include providing user/device information collected by the media processors 106 and/or devices 116, such as media consumption data, website accessing habits, purchasing history, and so forth.

Multiple forms of media services can be offered to media devices over landline technologies such as those described above. Additionally, media services can be offered to media devices by way of a wireless access base station 317 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other wide area wireless access network technologies can be used in one or more embodiments of the subject disclosure.

Figure 4:
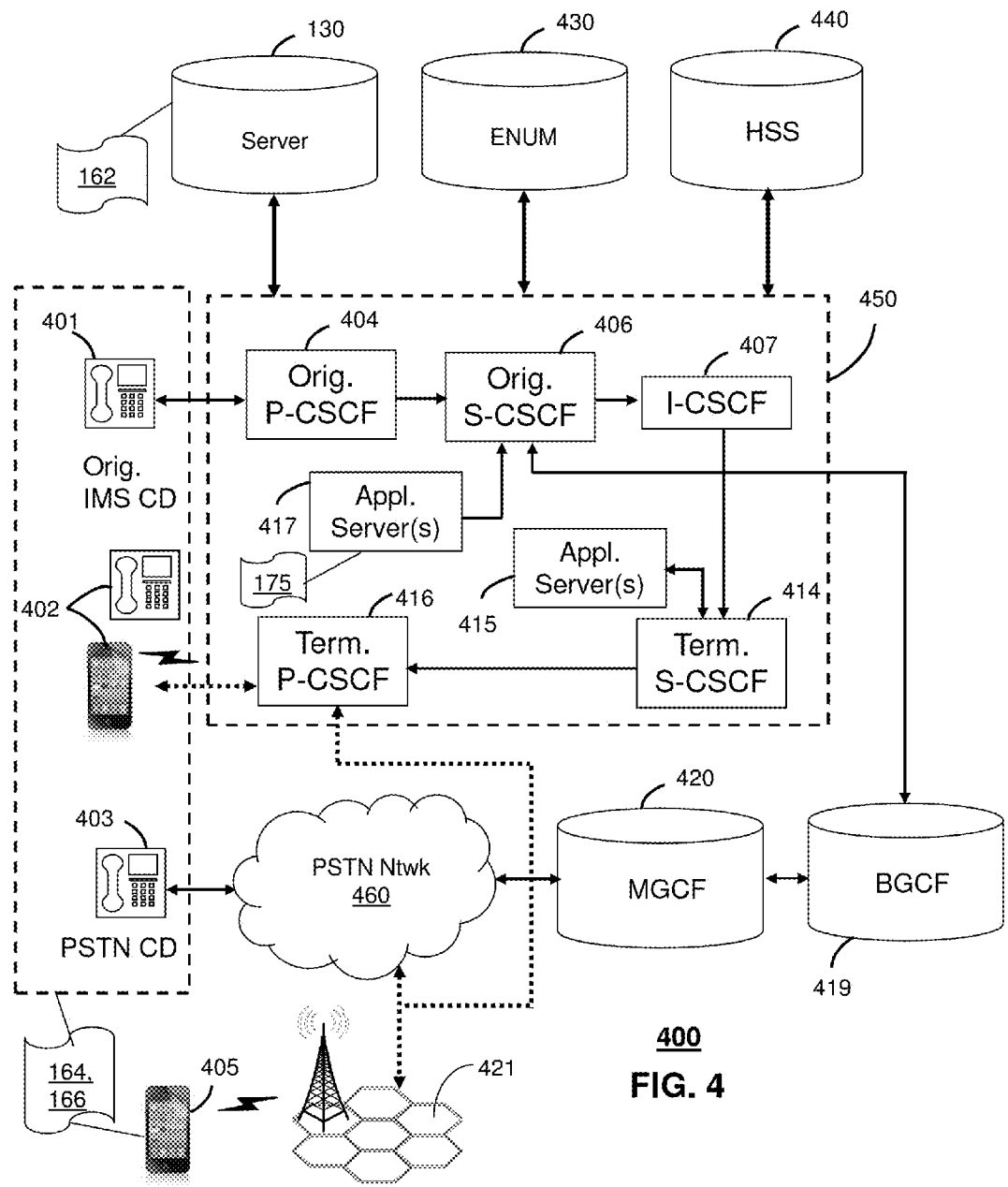

FIG. 4 depicts an illustrative embodiment of a communication system 400 employing an IP Multimedia Subsystem (IMS) network architecture to facilitate the combined services of circuit-switched and packet-switched systems.

Communication system 400 can be overlaid or operably coupled with communication systems 100 and 300 as another representative embodiment of communication systems 100 and 300. System 400 can include server 130 for collecting data and selecting targeted advertising on an individual and/or group level. System 400 can also be used for collecting other data that is utilized during the advertising selection process, such as data that is being transmitted over the IMS network (e.g., text messages including user commentary regarding products, services, television programming and/or advertisements). System 400 is illustrated utilizing an architecture of particular components and configurations. It should be understood that other components and/or configuration can also be utilized with system 400 such that the system performs the exemplary techniques described herein (e.g., one or more of the steps of methods 200 and/or 250) utilizing a different architecture. The exemplary embodiments can include various architectures performing the exemplary techniques and is not intended to be limited to the particular components and configurations illustrated in FIG. 4.

Communication system 400 can comprise a Home Subscriber Server (HSS) 440, a tElephone NUmber Mapping (ENUM) server 430, and other network elements of an IMS network 450. The IMS network 450 can establish communications between IMS-compliant communication devices (CDs) 401, 402, Public Switched Telephone Network (PSTN) CDs 403, 405, and combinations thereof by way of a Media Gateway Control Function (MGCF) 420 coupled to a PSTN network 460. The MGCF 420 need not be used when a communication session involves IMS CD to IMS CD communications. A communication session involving at least one PSTN CD may utilize the MGCF 420.

IMS CDs 401, 402 can register with the IMS network 450 by contacting a Proxy Call Session Control Function (P-CSCF) which communicates with an interrogating CSCF (I-CSCF), which in turn, communicates with a Serving CSCF (S-CSCF) to register the CDs with the HSS 440. To initiate a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to one or more application servers (ASs) 417 that can provide a variety of services to IMS subscribers.

For example, the application servers 417 can be used to perform originating call feature treatment functions on the calling party number received by the originating S-CSCF 406 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 406 can submit queries to the ENUM system 430 to translate an E.164 telephone number in the SIP INVITE message to a SIP Uniform Resource Identifier (URI) if the terminating communication device is IMS-compliant. The SIP URI can be used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE message to the terminating S-CSCF 414. The terminating S-CSCF 414 can then identify a terminating P-CSCF 416 associated with the terminating CD 402. The P-CSCF 416 may then signal the CD 402 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 4 may be interchangeable. It is further noted that communication system 400 can be adapted to support video conferencing. In addition, communication system 400 can be adapted to provide the IMS CDs 401, 402 with the multimedia and Internet services of communication system 300 of FIG. 3.

If the terminating communication device is instead a PSTN CD such as CD 403 or CD 405 (in instances where the cellular phone only supports circuit-switched voice communications), the ENUM system 430 can respond with an unsuccessful address resolution which can cause the originating S-CSCF 406 to forward the call to the MGCF 420 via a Breakout Gateway Control Function (BGCF) 419. The MGCF 420 can then initiate the call to the terminating PSTN CD over the PSTN network 460 to enable the calling and called parties to engage in voice and/or data communications.

It is further appreciated that the CDs of FIG. 4 can operate as wireline or wireless devices. For example, the CDs of FIG. 4 can be communicatively coupled to a cellular base station 421, a femtocell, a WiFi router, a Digital Enhanced Cordless Telecommunications (DECT) base unit, or another suitable wireless access unit to establish communications with the IMS network 450 of FIG. 4. The cellular access base station 421 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 4.

Cellular phones supporting LTE can support packet-switched voice and packet-switched data communications and thus may operate as IMS-compliant mobile devices. In this embodiment, the cellular base station 421 may communicate directly with the IMS network 450 as shown by the arrow connecting the cellular base station 421 and the P-CSCF 416.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 130 of FIG. 3 can be operably coupled to the second communication system 400 for purposes similar to those described above. Server 130 can perform function 162 and thereby provide targeted advertising services to the CDs 401, 402, 403 and 405 of FIG. 4. CDs 401, 402, 403 and 405, which can be adapted with software to perform functions 164, 166 to utilize the services of the server 130. Server 130 can be an integral part of the application server(s) 417 performing function 175, which can be similar to function 162 (e.g., collecting data related to user interaction with a social media network, collecting other data related to products/services/TV programming/advertisements) and adapted to the operations of the IMS network 450.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 5:
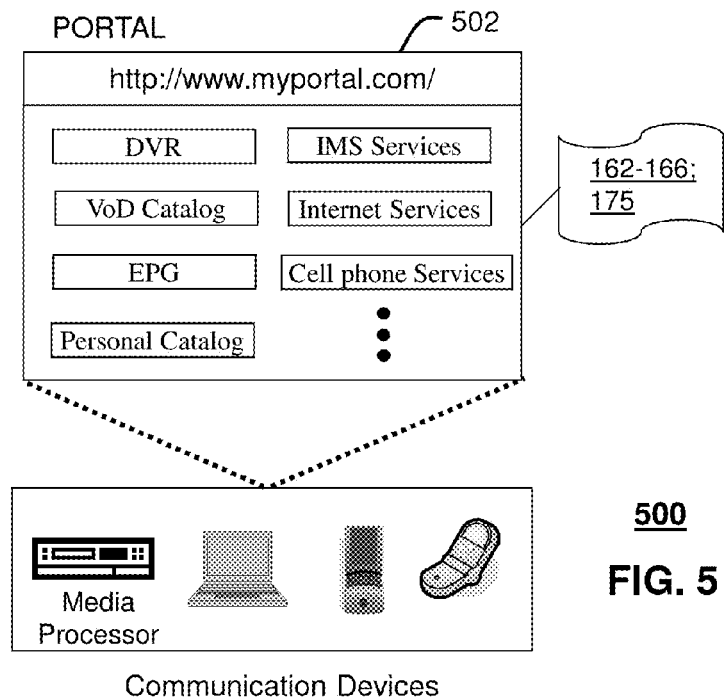
FIG. 5 depicts an illustrative embodiment of a web portal for interacting with the communication systems of FIGS. 1 and 3-4.

FIG. 5 depicts an illustrative embodiment of a web portal 502 which can be hosted by server applications operating from the computing devices 130 of the communication system 300 illustrated in FIG. 3. The web portal 502 can be used for managing services of communication systems 100 and 300-400. A web page of the web portal 502 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1 and 3-4. The web portal 502 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 502 can also be used for provisioning IMS services described earlier, provisioning Internet services, provisioning cellular phone services, and so on.

Web portal 502 can also be used by users to provide information to the server 130 regarding the targeted advertising. For example, user authorization to collect and mine social media data can be provided via the web portal 502. The authorization can be on different levels, such as allowing collection and mining of "open" information which others on the social media network can see, but denying access to more private information. In one or more embodiments, web portal 502 can be utilized by users to provide preferences regarding targeted advertising. For instance, users can provide information regarding recent purchases (e.g. a car) to the web portal so that the server 130 can consider the recent purchase in selecting the targeted advertising.

Figure 6:
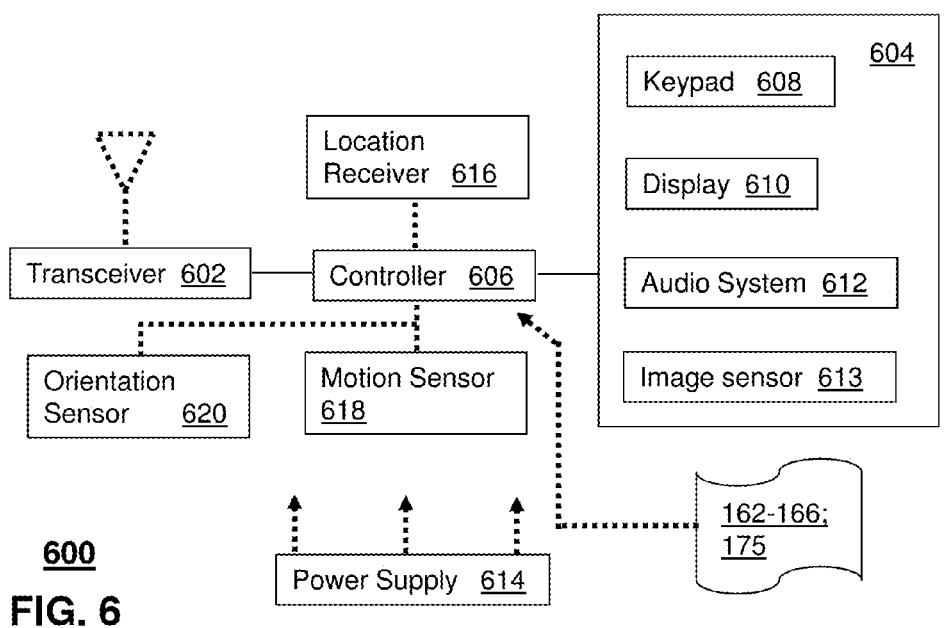
FIG. 6 depicts an illustrative embodiment of a communication device utilized in the communication systems of FIGS. 1 and 3-4.

FIG. 6 depicts an illustrative embodiment of a communication device 600. Communication device 600 can serve in whole or in part as an illustrative embodiment of the devices depicted in FIGS. 1 and 3-5. The communication device 600 can present targeted advertising (targeted on a group level and/or targeted on a user level) that is inserted into television programming being presented by the device. In one or more embodiments, the communication device 600 can perform data collection which is mined and used in selecting the targeted advertising. The data collection can include purchasing history, media consumption history, providing user profiles, monitoring internet website viewing, and so forth. In one or more embodiments, the communication device 600 can receive the targeted advertising and can insert the targeted advertising into an advertisement slot based on a channel that the user is viewing at the device. In one or more embodiments, the server 130 can select the targeted advertising and select the targeted broadcast programming, while the communication device 600 selects an advertisement slot from amongst a group of slots based on a context of a segment of the programming immediately preceding the selected advertisement slot. Context determination can be performed by the device 600 based on a number of techniques, including analysis of metadata associated with the programming or speech or image recognition analysis.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 110 can be an integral part of the housing assembly of the communication device 100 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), and/or a video processor with associated storage memory such as Flash, ROM, RAM, SRAM, DRAM or other storage technologies for executing computer instructions, controlling, and processing data supplied by the aforementioned components of the communication device 100.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 100 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of the media processor 106, the media devices 108, or the portable communication devices 116 of FIGS. 1 and 3, as well as the IMS CDs 401-402 and PSTN CDs 403-405 of FIG. 4. It will be appreciated that the communication device 600 can also represent other devices that can operate in the communication systems of FIGS. 1 and 3-4 such as a gaming console and a media player.

The communication device 600 shown in FIG. 6 or portions thereof can serve as a representation of one or more of the devices of communication systems 100 and 300-400. In addition, the controller 606 can be adapted in various embodiments to perform the functions 162-166 and 175, respectively, to facilitate the collection of data from various sources where the data is utilized in selecting targeted advertising for groups of users and for individual users.

Upon reviewing the aforementioned embodiments, it would be evident to an artisan with ordinary skill in the art that said embodiments can be modified, reduced, or enhanced without departing from the scope of the claims described below. For example, the analysis of the social media data, such as the user commentary and interaction information, can be used to generate guidelines or feedback that are provided to advertising sources so that advertisements can be adjusted or new advertisements produced to better suit the audience to which they will be presented. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
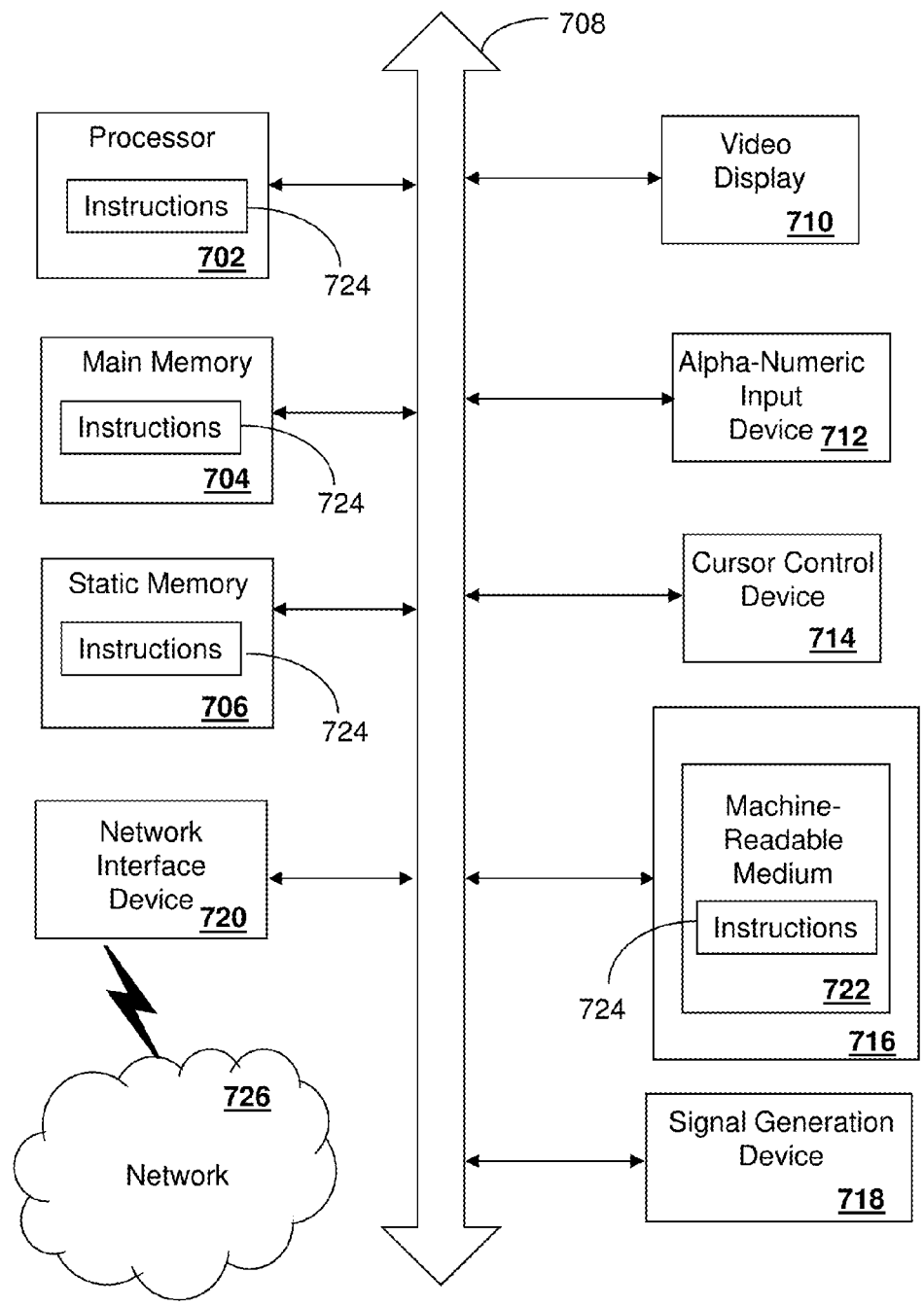
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods describe above. One or more instances of the machine can operate, for example, as the server 130, media processor 106, mobile device 116 and other devices of FIGS. 1-6. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor or other forms of instructions manifested as a state machine implemented with logic components in an application specific integrated circuit or field programmable array. Furthermore, software implementations can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations on a controllable component may perform such operations on the controllable device directly or indirectly by way of an intermediate device directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments (including combining selected features or removing selected features), and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    identifying, by a processing system comprising a processor, a first group of users of a plurality of users of a social media network based on social media posts associated with media content that are posted by the first group of users;
    identifying, by the processing system, a second group of users of the plurality of users of the social media network, wherein the second group of users have consumed the media content;
    identifying, by the processing system, a third group of users of the plurality of users of the social media network, wherein the third group of users have indicated during user interaction with the social media network an interest in commercial items;
    determining, by the processing system, a first subset of the first group of users that are part of the third group of users and a second subset of the second group of users that are part of the third group of users;
    generating, by the processing system, a user model that correlates a characteristic associated with the first subset of the first group of users and the second subset of the second group of users;
    identifying, by the processing system, a target consumer of the third group according to the user model based on a first social media post by the target consumer via a first device utilized by the target consumer and a first media consumption by the target consumer via a second device utilized by the target consumer;
    predicting, by the processing system, a target media program that the target consumer is likely to view according to the user model;
    for the target consumer of the target media program, selecting, by the processing system, a target commercial from a set of commercials based on the user model
    accessing, by the processing system and from a first device used by the target consumer, instructions that pair the first device to a second device used by the target consumer; and
    transmitting, by the processing system, the target commercial to the second device according to the instructions.

2. The method of claim 1, wherein the user model is based on one of individual level information, wherein the individual level information comprises social media login information, for individual users of the plurality of users of the social media network.

3. The method of claim 2, wherein a portion of the individual level information is obtained based on opt-in user authorizations and information access policies of the social media network.

4. The method of claim 1, wherein the target commercial is determined based on group level information, wherein the group level information comprises aggregated social media login information for the plurality of users of the social media network, and wherein a portion of the group level information is obtained without an opt-in user authorization.

5. The method of claim 1, wherein the target commercial is determined based on an analysis of text posts, image posts, video posts, audio posts, social connections among users and user locations.

6. The method of claim 1, wherein the user model is based on individual level information, and wherein the individual level information comprises user profile information associated with individual users of the plurality of users of the social media network.

7. The method of claim 1, wherein the user model is based on individual level information, and wherein the individual level information comprises web click data indicating internet browsing and purchasing history associated with individual users of the plurality of users of the social media network.

8. The method of claim 1, wherein the user model is based on individual level information, and wherein the individual level information comprise location information for individual users of the plurality of users of the social media network.

9. The method of claim 1, wherein the target commercial is determined based on group level information, wherein the group level information comprises aggregated television usage information for the plurality of users of the social media network, and wherein a portion of the group level information is obtained without an opt-in user authorization.

10. The method of claim 1, wherein the target commercial is determined based on group level information, wherein the group level information comprises aggregated purchase history data for different products in different geographic areas for the plurality of users of the social media network, and wherein a portion of the group level information is obtained without an opt-in user authorization.

11. The method of claim 1, wherein the target commercial is determined based on group level information, wherein the group level information comprises aggregated location information for the plurality of users of the social media network, and wherein a portion of the group level information is obtained without an opt-in user authorization.

12. A device, comprising:
    a memory to store executable instructions; and
    a processing system including a processor communicatively coupled to the memory, wherein the executable instructions, responsive to being executed by the processor, facilitate performance of operations comprising:
    identifying a first group of users of a plurality of users of a social media network based on social media posts associated with media content that are posted by the first group of users;
    identifying a second group of users of the plurality of users of the social media network, wherein the second group of users have consumed the media content;
    identifying a third group of users of the plurality of users of the social media network, wherein the third group of users have indicated interest in commercial items during user interaction with the social media network;
    generating a user model that correlates a characteristic associated with a first portion of the first group of users, who are also members of the third group of users, and a second portion of the second group of users, who are also members of the third group of users;
    identifying a target consumer of the third group of according to the user model based on a first social media post by the target consumer via a first device utilized by the target consumer and a first media consumption by the target consumer via a second device utilized by the target consumer;
    predicting a target media program that the target consumer is likely to view according to the user model;
    for the target consumer of the target media program, selecting a target commercial from a set of commercials based on the user model;
    accessing, from a first device used by the target consumer, instructions that pair the first device to a second device used by the target consumer; and transmitting the target commercial to the second device according to the instructions.

13. The device of claim 12, wherein the user model is based on one of individual level information, wherein the individual level information comprises social media login information, user profile information, web click data indicating internet browsing and purchasing history, demographics, location information for individual users of the plurality of users of the social media network, or any combination thereof.

14. The device of claim 12, wherein the target commercial is determined based on group level information, wherein the group level information comprises aggregated social media login information for aggregated view of the plurality of users of the social media network, aggregated television usage for user groupings, purchase history data for different products in different geographic areas, aggregated demographics and aggregated location information, and wherein a portion of the group level information is obtained without an opt-in user authorization.

15. A machine-readable storage device comprising executable instructions which, responsive to being executed by a processing system including a processor, facilitate performance of operations comprising:

generating a user model that correlates a characteristic associated with first members of a first group of users of a social media network, who are also members of a third group of users of the social media network, and second members of a second group of users of the social media network, who are also members of a third group of users of the social media network, wherein social media posts associated with media content are posted by the first group of users, wherein the second group of users have consumed the media content, and wherein the third group of users have indicated interest in commercial items during user interaction with the social media network;

identifying a target consumer of the third group of according to the user model based on a first social media post by the target consumer via a first device utilized by the target consumer and a first media consumption by the target consumer via a second device utilized by the target consumer;

predicting a target media program that the target consumer is likely to view according to the user model;

for the target consumer of the target media program, selecting a target commercial from a set of commercials based on the user model;

accessing, from a first device used by the target consumer, instructions that pair the first device to a second device used by the target consumer; and transmitting the target commercial to the second device according to the instructions.

16. The machine-readable storage device of claim 15, wherein the user model is based on one of individual level information, wherein the individual level information comprises social media login information, user profile information, web click data indicating internet browsing and purchasing history, demographics, location information for individual users of a plurality of users of the social media network, or any combination thereof.

17. The machine-readable storage device of claim 15, wherein the target commercial is determined based on group level information, wherein the group level information comprises aggregated social media login information for aggregated view of a plurality of users of the social media network, aggregated television usage for user groupings, purchase history data for different products in different geographic areas, aggregated demographics and aggregated location information, and wherein a portion of the group level information is obtained without an opt-in user authorization.

* * * * *